US008708271B2

(12) United States Patent
Noll et al.

(10) Patent No.: US 8,708,271 B2
(45) Date of Patent: Apr. 29, 2014

(54) MANDREL USED FOR DIGITAL PRINTING ON CAN MEMBERS

(75) Inventors: Werner Noll, Huebingen (DE); Helmut Thate, Neustadt a. d. Weinstrasse (DE)

(73) Assignee: Ball Packaging Europe GmbH, Ratingen (DE)

( * ) Notice: Subject to any disclaimer, the term of this patent is extended or adjusted under 35 U.S.C. 154(b) by 1066 days.

(21) Appl. No.: 12/092,530

(22) PCT Filed: Nov. 3, 2006

(86) PCT No.: PCT/EP2006/068090
§ 371 (c)(1), (2), (4) Date: May 2, 2008

(87) PCT Pub. No.: WO2007/051848
PCT Pub. Date: May 10, 2007

(65) Prior Publication Data

US 2008/0282913 A1 Nov. 20, 2008

(30) Foreign Application Priority Data

Nov. 3, 2005 (EP) .................................... 05110323

(51) Int. Cl.
*B65H 75/24* (2006.01)
*B23Q 3/14* (2006.01)

(52) U.S. Cl.
USPC ..................... 242/573.7; 242/573.3; 269/48.1

(58) Field of Classification Search
USPC ............... 269/48.1, 50, 55; 242/573.1–573.7, 242/533.7, 573.3, 573.2, 571, 576.1; 248/62, 74.1, 316.1
See application file for complete search history.

(56) References Cited

U.S. PATENT DOCUMENTS

| | | | | |
|---|---|---|---|---|
| 2,562,021 A | | 7/1951 | Dotten | |
| 2,578,953 A | * | 12/1951 | Tyrrell | 242/573.7 |
| 2,909,338 A | * | 10/1959 | Cozzo | 242/573.2 |
| 3,291,427 A | | 12/1966 | Hutchings | |
| 3,356,019 A | | 12/1967 | Zurick | |
| 3,548,745 A | | 12/1970 | Sirvet et al. | |
| 3,563,170 A | | 2/1971 | Cvacho et al. | |
| 3,628,451 A | | 12/1971 | McClellan et al. | |

(Continued)

FOREIGN PATENT DOCUMENTS

WO WO 2004/012941 2/2004

OTHER PUBLICATIONS

International Search Report prepared by the European Patent Office on Mar. 12, 2007 for International Application No. PCT/EP2006/068090; Applicant, Ball Packaging Europe Holding GmbH & Co. KG.

*Primary Examiner* — Tan Le
(74) *Attorney, Agent, or Firm* — Sheridan Ross P.C.

(57) ABSTRACT

There is proposed a clamping mandrel for a rotationally symmetrical hollow body in the form of a beverage can integrally comprising a body portion and a bottom. Accurate coupling and precise control of the movement of the mandrel is to be transmitted to the hollow body. For that purpose there are provided a plurality of clamping segments forming an outwardly facing cylindrical clamping surface for engaging an inside surface of the hollow body. The clamping segments are radially movably guided. A force-transmission device arranged in the interior of the clamping mandrel is provided for synchronous control of the radial movement of the clamping segments. That provides for controlled precision movement of a hollow body clamped by the clamping device.

9 Claims, 2 Drawing Sheets

(56) References Cited

U.S. PATENT DOCUMENTS

Figure 1:
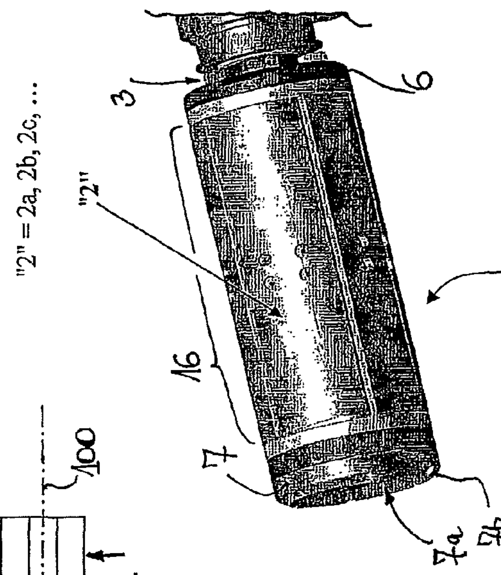

| | | | |
|---|---|---|---|
| 3,766,851 A | | 10/1973 | Sirvet et al. |
| 3,828,668 A | | 8/1974 | Zugcik |
| 3,960,073 A | * | 6/1976 | Rush ............................... 101/40 |
| 4,067,511 A | * | 1/1978 | Hermanns .................. 242/573.3 |
| 4,078,483 A | | 3/1978 | Gall |
| 4,086,859 A | | 5/1978 | Dondero |
| 4,134,565 A | | 1/1979 | Carter |
| 4,151,064 A | * | 4/1979 | Kuehnle ................... 204/298.28 |
| 4,629,528 A | | 12/1986 | Tanaka et al. |
| 4,672,898 A | | 6/1987 | Davidson |
| 4,889,050 A | | 12/1989 | Meador |
| 4,906,170 A | | 3/1990 | Nelson et al. |
| 5,029,523 A | | 7/1991 | Fields |
| 5,065,183 A | | 11/1991 | Morofuji et al. |
| 5,090,315 A | | 2/1992 | Lee et al. |
| 5,186,100 A | | 2/1993 | Turturro et al. |
| 5,207,153 A | | 5/1993 | Thomason |
| 5,259,913 A | | 11/1993 | Stover |
| 5,282,306 A | | 2/1994 | Katsuhiro et al. |
| 5,316,192 A | | 5/1994 | Ng |
| 5,329,871 A | | 7/1994 | Gibbs |
| 5,553,547 A | | 9/1996 | Miller |
| 5,677,719 A | | 10/1997 | Granzow |
| 5,743,189 A | | 4/1998 | Compera et al. |
| 5,799,574 A | | 9/1998 | Williams et al. |
| 5,831,641 A | | 11/1998 | Carlson |
| 5,906,304 A | | 5/1999 | Baldacchino |
| 5,941,109 A | | 8/1999 | Johnson et al. |
| 6,000,329 A | | 12/1999 | Averill |
| 6,082,680 A | | 7/2000 | Woodward et al. |
| 6,116,183 A | | 9/2000 | Crow et al. |
| 6,135,654 A | | 10/2000 | Jennel |
| 6,178,866 B1 | | 1/2001 | Searle et al. |
| 6,257,136 B1 | | 7/2001 | McLoy et al. |
| 6,367,380 B1 | | 4/2002 | Whelan |
| 6,397,740 B1 | | 6/2002 | Dubuit |
| 6,428,639 B1 | | 8/2002 | Oldenburg et al. |
| 6,563,280 B2 | | 5/2003 | Firehammer et al. |
| 6,651,552 B1 | | 11/2003 | Didonato |
| 6,695,501 B2 | | 2/2004 | Nedblake, Jr. et al. |
| 6,769,357 B1 | | 8/2004 | Finan |
| 6,786,443 B2 | * | 9/2004 | Trutschel ................... 242/533.7 |
| 6,920,822 B2 | | 7/2005 | Finan |
| 7,373,878 B2 | | 5/2008 | Finan |
| 7,377,216 B2 | | 5/2008 | Simon et al. |
| 2001/0042455 A1 | | 11/2001 | Ackley |
| 2001/0054470 A1 | | 12/2001 | Firehammer et al. |
| 2002/0162472 A1 | | 11/2002 | Liguori et al. |
| 2003/0010229 A1 | | 1/2003 | Fujita et al. |
| 2003/0034111 A1 | | 2/2003 | Oldenburg et al. |
| 2006/0201356 A1 | | 9/2006 | Johnson et al. |
| 2007/0169647 A1 | | 7/2007 | Conrad |

* cited by examiner

MANDREL USED FOR DIGITAL PRINTING ON CAN MEMBERS

CROSS REFERENCE TO RELATED APPLICATIONS

This application is a national stage application under 35 U.S.C. 371 of PCT Application No. PCT/EP2006/068090 having an international filing date of 3 Nov. 2006, which designated the United States, which PCT application claimed the benefit of European Application No. 05110323.2 filed 3 Nov. 2005, the entire disclosure of each of which are hereby incorporated herein by reference.

There are proposed a method and a clamping device for receiving and exactly fixing hollow bodies for carrying out controlled precision movements. That is intended to provide that the position of the hollow body can be so precisely controlled that digital printing on the outside surface of the wall of the hollow body is possible with a high degree of accuracy. Digital printing is replacing the colouring and decoration of the outside of the hollow body, which hitherto has been applied by a printing blanket method.

The invention concerns the cylindrical clamping device for rotationally symmetrical hollow bodies, in particular for cans or tins comprising a can body and a bottom integrally formed thereon, generally with a bottom which is curved inwardly in a dome shape.

It is known that, for processing (treating), in particular for printing on or decorating the outside surface of such hollow bodies, an exactly controlled, mostly stepwise movement in the form of rotation of the hollow body is extremely important for the accuracy and reliability of the operation of 'processing' the outside surface, see in that respect U.S. Pat. No. 6,767,357 (Joe Finan) concerning the printing operation, but not setting forth more detailed information regarding a clamping device.

U.S. Pat. No. 3,960,073 (Rush) describes a decoration apparatus for cans or tins integrally comprising a can body and a bottom, which has a plurality of identical clamping mandrels for the cans. Each clamping mandrel has a plurality of clamping segments with a cylindrical outside surface, which are guided synchronously radially movably by respective radial guide pins and which are biased in the direction of the radially retracted position by springs arranged on the pins.

Provided in the interior of the mandrel is a controlledly axially displaceable shaft, the axial movement of which is converted into the radial movement of the clamping segments by way of first inclined surfaces on the shaft and corresponding second inclined surfaces. The inclined surfaces are joined to the clamping segments. Axial displacement of the shaft is effected by mechanical control elements which are disposed outside the mandrel and which are connected to the shaft by way of suitable intermediate elements. A plurality of ducts open at the end face of the mandrel, which ducts can be connected at the other end to a source (of pressure or vacuum) in order to hold the can in its axial position on the clamping mandrel or however to expel the can from the clamping mandrel. The clamping function of the clamping mandrel is independently achieved and controlled in a purely mechanical fashion. For that purpose a large number of mutually co-operating individual parts which are matched to each other are required, and the pressure (increased pressure or over-pressure) does not play a controlling part in that respect.

Achieving accuracy and reliability in the treatment of an outside surface of a clamped hollow body, in the sense of processing, coating, in particular also printing thereon, even with a high speed in respect of rotation and treatment and/or the hollow body change, is the technical object of the claimed invention.

That object is attained by a clamping device in the form of a 'clamping bar' (also referred to as a clamping mandrel).

The claimed cylindrical clamping device is of a very simple structure. It comprises only relatively few parts which co-operate very rapidly and precisely. Necessary distances covered by the movable parts are short. In particular control of those parts is operated by way of a reduced pressure and an increased pressure in a very simple and reliable fashion.

The hollow body is gripped by the clamping segments of the cylindrical clamping device over a large area and securely but nonetheless carefully. That can provide for an exactly controlled, generally stepwise movement, in particular in the form of rotation of the gripped hollow body. That is the basis for reliable treatment of the outside surface of the clamped hollow body, in particular for printing thereon.

The clamping and holding forces become operative synchronously (uniformly) from the interior of the hollow body, in particular the can, and thus, with a corresponding radial pressure, the mandrel and the can are united to form a motion unit, the movements of which are controllable with a very high degree of accuracy. Any risk of permanent deformation of the can, as occur when a can is held from the outside or only at the end, is eliminated.

The parts and devices used for the controlled movement of the clamping elements are disposed in the interior of the clamping mandrel.

A reduced pressure and coupling on to the hollow body are particularly advantageous in regard to simplicity, amount of time involved and effectiveness. On the one hand, application and control of a reduced pressure or an increased pressure in the interior of the mandrel are possible without involving a high degree of complication and expenditure and with a great degree of exactitude and at high speed. On the other hand at the same time the hollow body is threaded on to or expelled from the mandrel, without additional means.

In that respect, the bottom of the hollow body, in conjunction with the free end of the mandrel, is used as a kind of valve element which automatically provides that, when the can is threaded on to the mandrel, by means of a reduced pressure, the bottom bears against the end of the mandrel, and the reduced pressure becomes operative to move the clamping segments radially outwardly, whereby they bear under pressure against the inside wall of the can.

The claimed method of accurate positioning and controlled—preferably stepwise—precision movement of rotationally symmetrical hollow bodies which 'integrally comprise' a body portion and a bottom (without a folded seam in the bottom region), in particular drinks cans, including those with an inwardly curved bottom, is made possible by the precise clamping action achieved. This involves accurate fixing of the hollow body without the risk of damage to or deformation of the hollow body.

The accuracy of the clamping action can be so paraphrased that a synonymous accuracy in the transmission of movement can also be achieved thereby, in a sense which can be referred to as 'suitable for digital printing'.

A rest position of the clamping device is achieved by a return force. It pulls the force-transmission device back into a rest position. That is suitable at any event for also compensating for fluctuating diameters of the hollow bodies which can be pushed on to the mandrel, with their fluctuating diameter.

Coupling of the force to the can which is sucked in position and held in place, as an example of a hollow body with a thin wall, is preferably improved in such a way that the clamping mandrel has an end face which is adapted to the shape of the can bottom at least in the region of the outlet of the axial bore. An inwardly directed, dome-shaped curvature (in the case of the can) is a dome-shaped curvature inwardly in the axial direction (in the case of the clamping mandrel).

The clamping mandrel has a shaft which is supported outside the clamping mandrel together with a multiplicity of identical mandrels in a carrier head which is rotatable in indexing steps. Provided at the end of the shaft is a dedicated, controllable drive which operates stepwise. The axial bore of the shaft can be controlledly connected to a source for higher or lower pressure. Both pressures are measured in relation to normal ambient pressure.

Figure 3:
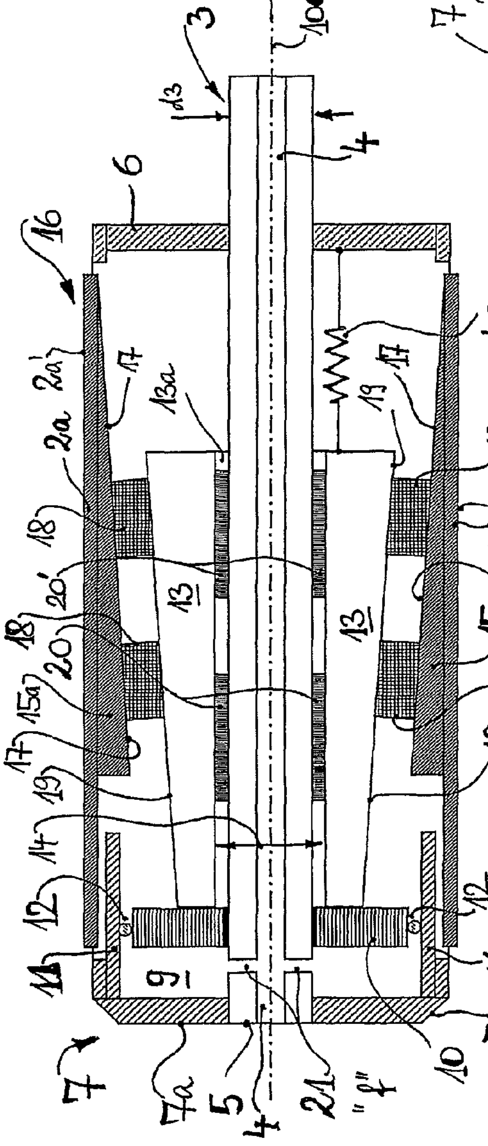
Figure 2:
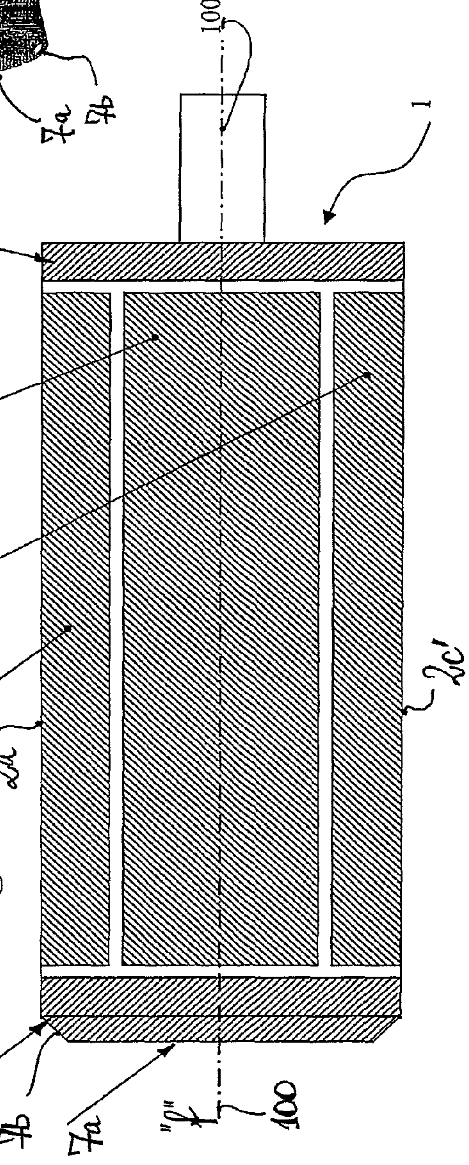
Figure 4:
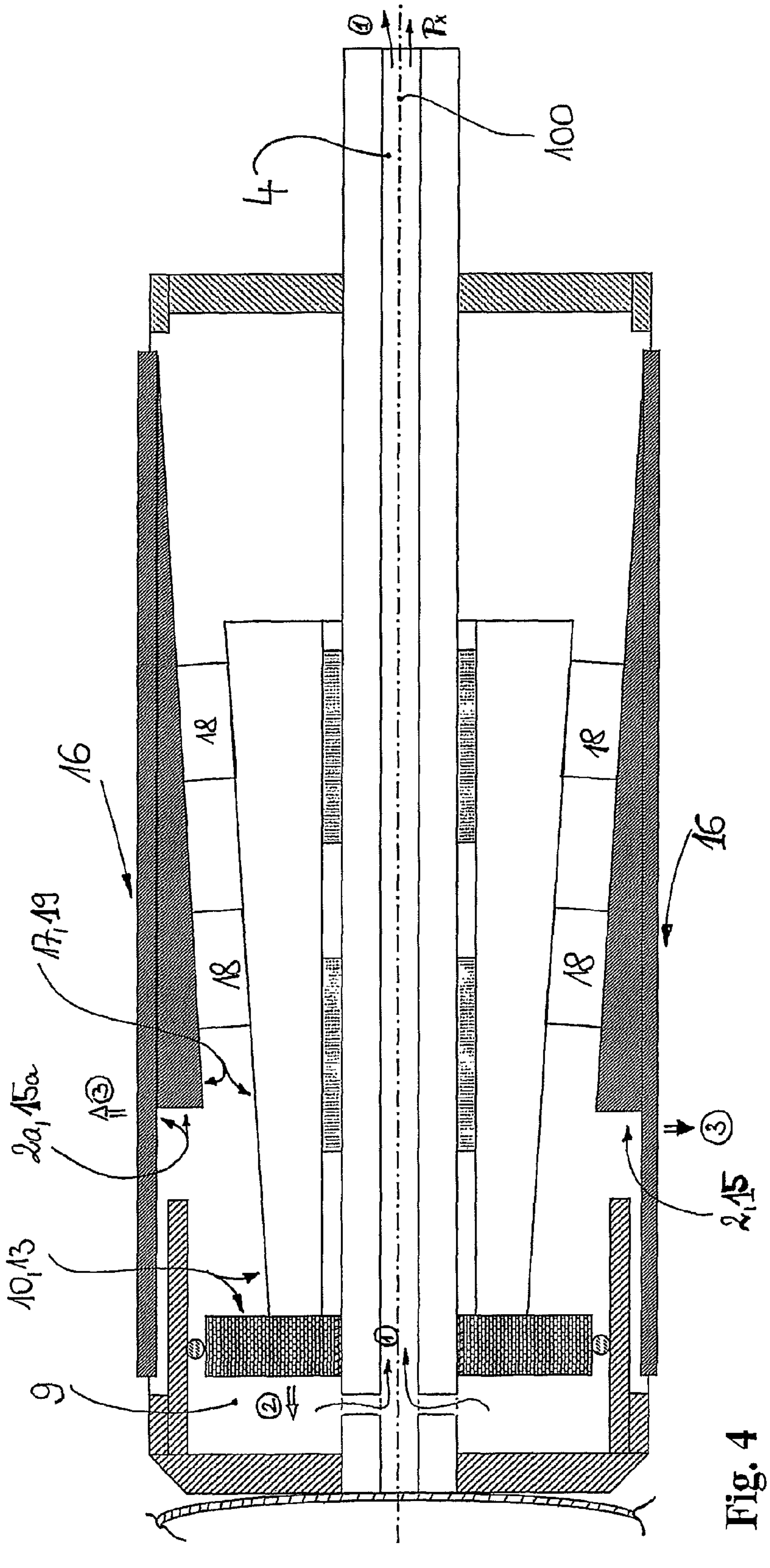

The invention is described in greater detail (supplemented and explained) hereinafter by means of a number of embodiments by way of example with reference to diagrammatic drawings in which:

FIG. 1 shows a perspective view of a clamping device 1 in the form of a clamping mandrel in accordance with a first example of the invention, FIG. 2 diagrammatically shows a side view of the clamping mandrel on a larger scale, FIG. 3 shows a diagrammatic view in longitudinal section through the clamping mandrel, and FIG. 4 shows a clamping mandrel in section similarly to FIG. 3 but identified rather in functional terms and on a larger scale; a can bottom is shown diagrammatically as bearing against the end face 7*b*.

An actual clamping surface 16 of the clamping device in the form of a clamping mandrel 1 is formed by a plurality of preferably identical clamping segments 2*a*, 2*b*, 2*c* and so forth (referred to for brevity by reference numeral 2) which each have a respective part-cylindrical outside surface as clamping surface portions and thus jointly form a cylindrical clamping surface 16. The clamping segments extend practically over the entire length of the clamping device 1 and are guided movably in the radial direction on a main body of the clamping device.

An example is the clamping surface portion 2*a*' which is associated with the clamping segment 2*a*. A corresponding consideration applies to the clamping segment 2*c* and the clamping surface portion 2*c*'.

The main body comprises a central shaft 3 which extends over the entire length of the clamping device and beyond one of its ends and on which two end wall elements 6 and 7 are fixed at the appropriate axial spacing, the clamping elements 2 extending between the end wall elements 6 and 7.

The end wall element 7 at the free end f of the clamping mandrel 1 (for brevity also referred to as the 'mandrel' 1) has a cylindrical wall 11 which extends axially by a distance into the interior of the mandrel. The axis 100 identifies the axial direction and the centre of the clamping device.

The shaft 3 has an axial opening therethrough, for example in the form of a bore 4, which terminates flush with the free end 5 of the shaft 3 and the outside surface 7*a* of the end wall element 7. At an axial distance from that end 5 and in the region of the cylindrical wall 11, the shaft has radial openings, for example bores 21, which communicate with the axial bore 4. Arranged somewhat further axially towards the interior of the mandrel and axially limitedly displaceable on the shaft 3 is a disc-shaped wall 10 which is guided sealingly and slidingly against the cylindrical wall 11 by way of a ring portion 12.

A rotationally symmetrical control or actuating portion 13 is fixedly connected to the disc-shaped wall portion 10. In a central cylindrical opening, the wall has a plane sliding bearing which is axially displaceable on the shaft 3.

The clamping mandrel 1 is carried by the shaft 3 which is supported outside the clamping mandrel together with a multiplicity of identical mandrels in a carrier head which is rotatable in indexing steps (this is indicated at the right in FIG. 1). Provided at the end of the shaft is a dedicated, controllable drive which operates stepwise but which is not shown here. The axial bore 4 of the shaft can be controlledly connected to a source (also not shown) for higher or lower pressure. Both pressures are measured in relation to normal ambient pressure. Increased pressure is used for releasing a gripped can. Reduced pressure is used for sucking on and clamping the can.

The end wall element 7 of the main body of the clamping mandrel, with the cylindrical wall 11 and the disc-shaped wall 10, forms a chamber 9 for a pressure or a reduced pressure (in relation to the ambient pressure). The control portion 13 is disposed axially outside the pressure chamber 9 but together with the disc-shaped wall 10 forms a force-transmission device as will be described in greater detail below.

The control portion 13 (also referred to as the actuating portion) has an axial opening, for example in the form of a bore 13*a*, the diameter 14 of which is visibly larger than the outside diameter d3 of the shaft 3. By means of interposed bearing sleeves 20 and 20', the control portion 13 is axially displaceably guided on the shaft and can thus itself carry and guide the wall 10, as a disc-shaped first control portion 10.

The second control portion 13 has an outside surface which extends in a slightly conical configuration in the axial direction.

As can be seen from FIG. 3 the clamping segments 2, on their inside, have a corresponding surface 17, that is to say which is conical in parallel relationship with the surface 19, as the inside surface of the clamping segments. As shown that surface can also be provided on separate elements 15 which however are fixedly connected to the clamping segments. Each of those clamping wedges 15 is associated with a respective clamping segment. That is to say, clamping wedge 15*a* with the clamping segment 2*a*, and clamping wedge 15*c* with the clamping segment 2*c*. Reference 15 denotes all clamping wedges (clamping elements), as reference 2 denotes all clamping segments 2*a*, 2*b*, 2*c* (and so on).

Arranged in the conical intermediate space between the mutually opposite surfaces 17 and 19 are corresponding support and force-transmission elements 18 which are fixedly connected to one of the two portions 2 or 13. If the surface 19 is peripherally continuous, the surface 17 is composed of segments, as is predetermined by the segments 2*a*, 2*b*, 2*c*, or by the clamping wedges 15*a*, 15*c*. Then for example the clamping wedge 15*c* has the conically extending segment surface 15*c*' which forms a portion of the conical inside surface 17.

The radial movement of the clamping segments 2 is produced by means of a reduced pressure for the clamping action and by means of an increased pressure for releasing the clamping effect. Both kinds of pressure become operative by way of the axial bore 4 of the shaft 3 (being supplied or discharged therethrough). The pressure-generating device for the respective pressure is not shown.

Both pressures are used to mount a rotationally symmetrical hollow body which comprises a bottom and a body portion, for example a beverage can, axially on to the mandrel, and to expel it from the mandrel. In that situation, the can bottom is used together with the outside surface of the end wall element 7 in order automatically to trigger the clamping movement of the clamping segments 2 only when the can is properly threaded on the mandrel in the axially finished position (completely) and to begin the expulsion operation only when the clamping segments have appropriately released the can.

A front outside surface 7*a* of the end wall element 7 is so designed that, with the can bottom bearing thereagainst, it has an annular contact in line form or in the form of an area, which stops air from being sucked from the exterior by the reduced pressure applied in the bore 4, so that now the reduced pressure acts by way of the radial bores 21 and the chamber 9 on the disc-shaped wall 10 and moves it together with the control portion 13 towards the left in FIG. 3.

Upon an axial advance movement of the control portion, all clamping segments 2 are moved radially outwardly by way of the co-operating conical surfaces. The control portion therefore actuates the clamping segments 2*a*, 2*b*, 2*c* (and so forth) jointly and synchronously outwardly. It is therefore also referred to as the actuating portion 13.

A good coupling effect is achieved if the shape of the dome-shaped bottom of the hollow body which is not shown but which is generally known is matched to the shape of the end of the clamping mandrel. That end is the front outside surface of the front end wall element. Concave/convex adaptation is suitable.

In that respect, as an example, FIG. 3 shows a flat end face 7*a* which at its edge has a peripherally extending chamfer 7*b* on the end wall element 7. The bore 4 in the shaft 3 is smaller in diameter than a central portion, which covers it at the end from the front, of the dome-shaped inward curvature of the bottom of the hollow body so that, when the hollow body is sucked on to the clamping mandrel, a sealing action is achieved at at least the front circular edge of the axially elongate continuous bore.

The above-mentioned convex/concave adaptation of at least an inner region of the end wall 7*a* (curved inwardly towards the right) and the bottom, curved outwardly towards the right, of the hollow body is not separately shown in FIG. 3 but will be apparent to the man skilled in the art from this description. In that respect the peripherally extending chamfer 7*b* serves in addition for better adaptation of the initial movement of the hollow body as it is pushed on to the clamping device and avoidance of a sharp edge in the internal space of the can clamped on the mandrel.

When the hollow body is to be released from the clamping mandrel 1 compressed air is passed into the chamber 9 by way of the axial bore 4. It displaces the controlling first/second portion 10 and 13 as an adjusting device axially towards the end of the shaft (towards the right) and releases the holding force of the clamping segments 2. When that holding force ends the compressed air acts by way of the front end of the bore 4 on the bottom of the hollow body and thus expels it from the mandrel.

A return movement of the control device 10/13 can be achieved by a spring 40. It is arranged between the control portion 13 and the end wall element 6. It provides that, after the hollow body has been blown off the clamping mandrel, the control portion 13 is moved into a rest position, referred to as the neutral position, and does not remain in an undefined axial positional state, as an axial intermediate position. In that way the next hollow body can be satisfactorily axially pushed on to the clamping mandrel.

Diameter fluctuations in the hollow body, which are caused by tolerance, are compensated.

FIG. 4 is oriented rather in functional terms. The description thereof can be deduced from FIG. 3, in which respect there is indicated a can bottom which bears sealingly against the front opening of the long bore 4 in the shaft 3. As the front outside surface 7*a* of the end wall element 7 has sealing contact with the can bottom bearing thereagainst, and that stops air from being sucked in from the outside due to the reduced pressure applied in the bore 4, the reduced pressure $P_x$ now acts by way of the radial bores 21 in the chamber 9 and on the control device 10/13 which moves towards the left. In the event of an axial advance movement of the control device 10/13, all clamping segments 2 are moved jointly synchronously radially outwardly by way of the co-operating conical surfaces 17/19. Mechanical bracing of the hollow body thus begins only when the axial suction movement is concluded. That is effected in a staggered procedure on its own and does not entail any critical dead times or necessities which are to be measured. The procedure involves a kind of self-regulation of the clamping operation, under pneumatic control.

If the hollow body is also to be released from the clamping mandrel 1 in FIG. 4, compressed air is passed into the chamber 9 by way of the axial bore 4. That displaces the control device 10/13 axially towards the shaft end (towards the right) and releases the holding force of the clamping segments 2 by the synchronous radial inward displacement thereof. When that radial holding force on the can wall (not shown) ends, the compressed air also acts on its own accord from the diagrammatically illustrated bottom and thus expels it from the mandrel.

The procedure in the bracing operation is identified in FIG. 4 in functional respects with ringed references (1) to (3).

(0) suction on/sealing
(1) evacuation of the chamber 9
(2) axial displacement of the control device 10/13
(3) radial expansion of the clamping segments 2/15.

The arrangement is of a very simple structure and nonetheless operates extremely accurately. The hollow bodies are engaged and held from the interior over a large area and securely but also carefully by the clamping segments. The necessary distances to be covered by the movable parts of the mandrel are short. Control by means of a reduced pressure and an increased pressure is simple and reliable, in particular in respect of automatic coupling of the end of the operation of axially sucking the hollow body on to the mandrel and the beginning of radial clamping of the clamping segments.

In the clamping position, the hollow body and the mandrel form a functional unit which can be reliably moved by a controlled movement of the shaft 3 in any direction and with any stepping distance and at any stepping speed. That involves primarily rotational movements for a treatment on the outside surface of the hollow body, for example printing thereon or coating it in the sense of an application procedure which is to be highly accurately controlled in respect of its position.

The invention claimed is:

1. A method of location-accurate positioning and controlled precision movement of rotationally symmetrical hollow bodies, in particular integral cans comprising a body portion and a bottom, the method comprising:

synchronously applying radially acting clamping forces to a rotationally symmetrical inside surface of a hollow body by means of a plurality of clamping surfaces provided on a rotatable clamping mandrel and forming an outwardly facing cylindrical clamping surface for engaging an inside surface of the hollow body;

rotating said clamping mandrel and said hollow body; and synchronously disengaging said clamping surfaces from said hollow body;

wherein the radially acting clamping forces are at least one of applied and released by a pressure change caused by air flow through the clamping mandrel.

2. A method of location-accurate positioning and controlled precision movement of rotationally symmetrical hollow bodies formed integrally from a body portion and a bottom, by means of a rotatable clamping mandrel for each of the hollow bodies, the method comprising:

co-axially fitting a hollow body on to the clamping mandrel by providing a reduced pressure within the clamping mandrel;

bracing the hollow body with the clamping mandrel by a pressure force caused by the reduced pressure acting radially from the clamping mandrel, wherein the pressure force is applied by clamping segments moved outwardly and synchronously by the reduced pressure; and rotating said clamping mandrel and said hollow body with a motion unit, the motion unit comprising a controllable drive and a shaft.

3. The method according to claim 2, wherein the motion unit of the clamping mandrel and the hollow body are released by means of compressed air.

4. The method of claim 2, wherein a control portion of the mandrel is provided with a return device which applies an axial force axially rearwardly away from a front end of the clamping mandrel.

5. The method according to claim 4, wherein the return device is biased in the retracted rest position of the control portion by a spring.

6. The method of claim 4, wherein the control portion is returned by the axial force loading after a respective removal of a hollow body from the clamping mandrel into a neutral rest position which is so positioned that even hollow bodies which fluctuate in diameter can be axially received by the clamping mandrel in the rest position of the control portion.

7. A method of location-accurate positioning and controlled precision movement of rotationally symmetrical hollow bodies formed from a body portion and an integrally adjoining bottom, by means of a controlledly moved clamping mandrel for each of the hollow bodies, comprising:

co-axially fitting a hollow body on to a clamping mandrel;

bracing the hollow body with the clamping mandrel by a reduced pressure within the clamping mandrel acting radially from the inside outwardly; and providing a controlled precision rotational movement of the clamping mandrel with a motion unit, the motion unit comprising a controllable drive and a shaft.

8. The method according to claim 3, further comprising the step of axially removing the hollow body from the clamping mandrel with the same compressed air.

9. The method of claim 7, wherein the controlled precision movement is a stepwise movement.

* * * * *